United States Patent
Filipi et al.

(10) Patent No.: US 11,738,888 B2
(45) Date of Patent: Aug. 29, 2023

(54) MOMENTUM WHEELS AND REACTION WHEELS FOR OBJECTS IN SPACE

(71) Applicant: AST & Science, LLC, Miami, FL (US)

(72) Inventors: Darko Filipi, Washington, DC (US); Abel Avellan, Coral Gables, FL (US); William E. Bialke, Trumansburg, NY (US); Daniele Addari, London (GB); Darren J. Zanon, Falls Church, VA (US); Adam H. Halperin, Silver Spring, MD (US); Huiwen Yao, Potomac, MD (US)

(73) Assignee: AST & Science, LLC, Midland, TX (US)

( * ) Notice: Subject to any disclaimer, the term of this patent is extended or adjusted under 35 U.S.C. 154(b) by 0 days.

(21) Appl. No.: 17/696,506

(22) Filed: Mar. 16, 2022

(65) Prior Publication Data

US 2022/0297857 A1 Sep. 22, 2022

Related U.S. Application Data

(60) Provisional application No. 63/161,677, filed on Mar. 16, 2021.

(51) Int. Cl.
*B64G 1/28* (2006.01)
*B64G 1/24* (2006.01)

(52) U.S. Cl.
CPC .............. *B64G 1/283* (2013.01); *B64G 1/244* (2019.05)

(58) Field of Classification Search
CPC ................................. B64G 1/283; B64G 1/285
USPC ....................................................... 244/165
See application file for complete search history.

(56) References Cited

U.S. PATENT DOCUMENTS

| | | | |
|---|---|---|---|
| 6,157,621 A | 12/2000 | Brown et al. | |
| 8,640,994 B1 * | 2/2014 | Cosner | B64G 1/1021 244/164 |
| 9,551,994 B2 * | 1/2017 | Becker | B64G 1/285 |
| 9,973,266 B1 | 5/2018 | Avellan et al. | |
| 10,144,531 B2 * | 12/2018 | Sobel | B64G 1/36 |
| 10,882,640 B2 * | 1/2021 | Lui | B64G 1/244 |
| 10,979,133 B2 | 4/2021 | Avellan et al. | |
| 2002/0041328 A1 * | 4/2002 | LeCompte | G01C 11/025 348/144 |
| 2006/0038083 A1 | 2/2006 | Criswell | |

(Continued)

FOREIGN PATENT DOCUMENTS

| | | | | |
|---|---|---|---|---|
| CN | 109335023 A | * | 2/2019 | B64G 1/10 |
| CN | 112173171 A | * | 1/2021 | |

(Continued)

OTHER PUBLICATIONS

International Search Report and Written Opinion received in PCT Application No. PCT/US2022/020542, dated Jun. 14, 2022.

*Primary Examiner* — Christopher P Ellis
(74) *Attorney, Agent, or Firm* — Shumaker & Sieffert, P.A.

(57) ABSTRACT

A spacecraft has a flat antenna array having an edge and a middle portion. A reconfigurable reaction-momentum wheel is coupled to the antenna array to roll and/or pitch the antenna array in small magnitudes. The reconfigurable reaction-momentum has a reaction operating state or mode (high-torque, low momentum) and a momentum operating state or mode (low-torque, high momentum). A thruster is coupled to the antenna array to move the antenna array.

21 Claims, 4 Drawing Sheets

(56) References Cited

U.S. PATENT DOCUMENTS

| | | | |
|---|---|---|---|
| 2008/0099626 A1* | 5/2008 | Bialke | B64G 1/244 244/165 |
| 2009/0230250 A1* | 9/2009 | Wehner | B64G 1/407 244/172.7 |
| 2011/0071751 A1* | 3/2011 | Benavides | G01S 15/88 701/124 |
| 2015/0027244 A1* | 1/2015 | Casteras | B64G 1/285 74/5.46 |
| 2016/0056321 A1 | 2/2016 | Atwater et al. | |
| 2017/0225806 A1* | 8/2017 | Sobel | B64G 1/26 |
| 2019/0239090 A1 | 8/2019 | Walker | |
| 2020/0010221 A1 | 1/2020 | Fraze | |
| 2021/0253276 A1* | 8/2021 | Halperin | B64G 1/443 |

FOREIGN PATENT DOCUMENTS

| | | | | |
|---|---|---|---|---|
| CN | 112572838 A | * | 3/2021 | ............ B64G 1/244 |
| CN | 113120256 A | * | 7/2021 | |
| CN | 113619816 A | * | 11/2021 | |
| CN | 111559519 B | * | 2/2022 | ............ B64G 1/105 |
| CN | 114212277 A | * | 3/2022 | |
| EP | 1428754 A1 | * | 6/2004 | ............ B64G 1/24 |
| EP | 1422138 B1 | * | 7/2014 | ............ B64G 1/361 |
| EP | 2965995 A1 | * | 1/2016 | ............ B64G 1/283 |
| EP | 3705408 A1 | * | 9/2020 | ............ B64G 1/244 |
| JP | H10159708 A | * | 6/2018 | |
| WO | WO-2004005134 A1 | * | 1/2004 | ............ B64G 1/283 |
| WO | WO-2021/179022 A2 | | 9/2021 | |

* cited by examiner

MOMENTUM WHEELS AND REACTION WHEELS FOR OBJECTS IN SPACE

CROSS-REFERENCE TO RELATED APPLICATIONS

This application claims the benefit of priority of U.S. Application Ser. No. 63/161,677 filed on Mar. 16, 2021, the content of which is relied upon and incorporated herein by reference in its entirety.

BACKGROUND

The disclosure relates generally to wheels used for objects is space, such as for a spacecraft. U.S. Patent Publ. No. 2008/0099626 to William Bialke discloses a reconfigurable reaction wheel for a space craft, the entire content of which is hereby incorporated by reference.

U.S. Pat. Nos. 9,973,266 and 10,979,133 show a system for assembling a large number of small satellite antenna assemblies in space to form a large array. The entire content of the '266 patent is incorporated herein by reference. As disclosed in the '266 patent, FIGS. 1(a), 1(b) show a satellite communication system 10 having an array 30 of common or small satellites 32 and a central or control satellite 20. The small satellites 32 communicate with end users 50 within a footprint 40 on Earth, and also communicate with the control satellite 20, which in turn communicates with a gateway 60 at a base station. The small satellites 32 can each include, for example, a processing device (e.g., a processor or controller) and one or more antenna elements. And the control satellite 20 can include a processing device and one or more antenna or antenna elements.

SUMMARY

A spacecraft is provided that has a flat antenna array having an edge and a middle portion. A reconfigurable reaction-momentum wheel is coupled to the antenna array to roll and/or pitch the antenna array in small magnitudes. The reconfigurable reaction-momentum has a reaction operating state or mode (high-torque, low momentum) and a momentum operating state or mode (low-torque, high momentum). A thruster is coupled to the antenna array to move the antenna array.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1A:
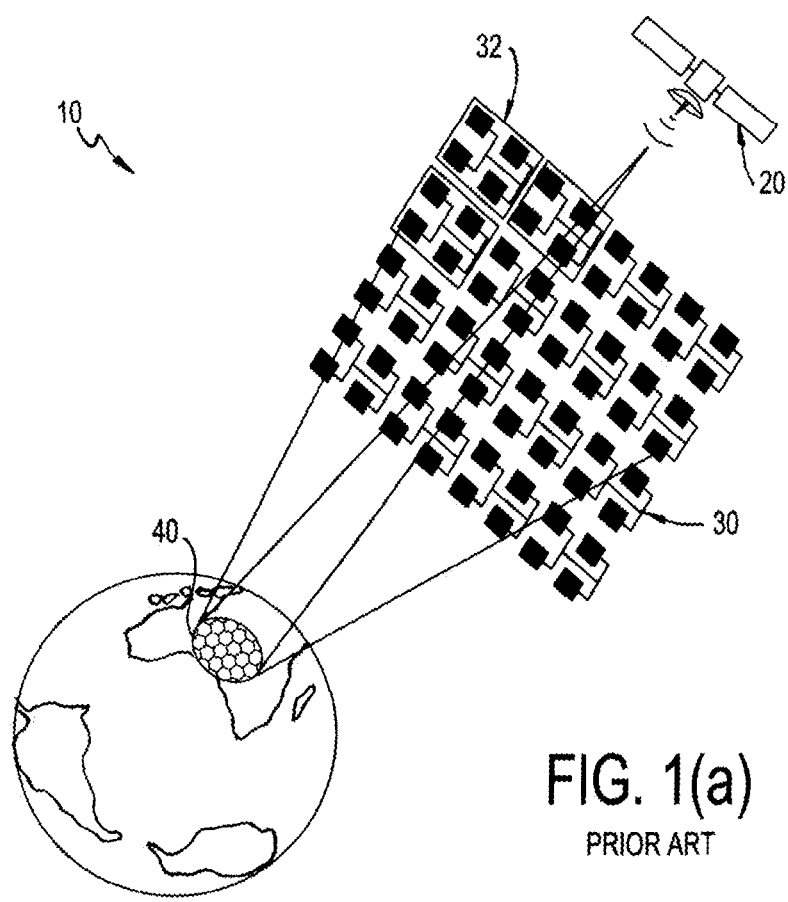
FIGS. 1(a), 1(b) show a large array.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

The system presented herein describes an optimized system that maintains spacecraft, which has large moments of inertia, orientation (attitude) alignment for using classically separated functions into combined components. The reconfigurable reaction-momentum wheels, as described in U.S. Patent Publ. No. 2008/0099626, are utilized in a system that, when combined with other elements of the embodiments, provides one illustrative example of the present disclosure. However, other reconfigurable reaction-momentum wheels can be utilized, within the spirit and scope of the present disclosure. As used herein, the reconfiguration reaction-momentum wheel is one or more discs or wheels housed in a housing, that can be selectively operated in accordance with a reaction operating state or mode (high-torque, low momentum) and a momentum operating state or mode (low-torque, high momentum).

Figure 2:
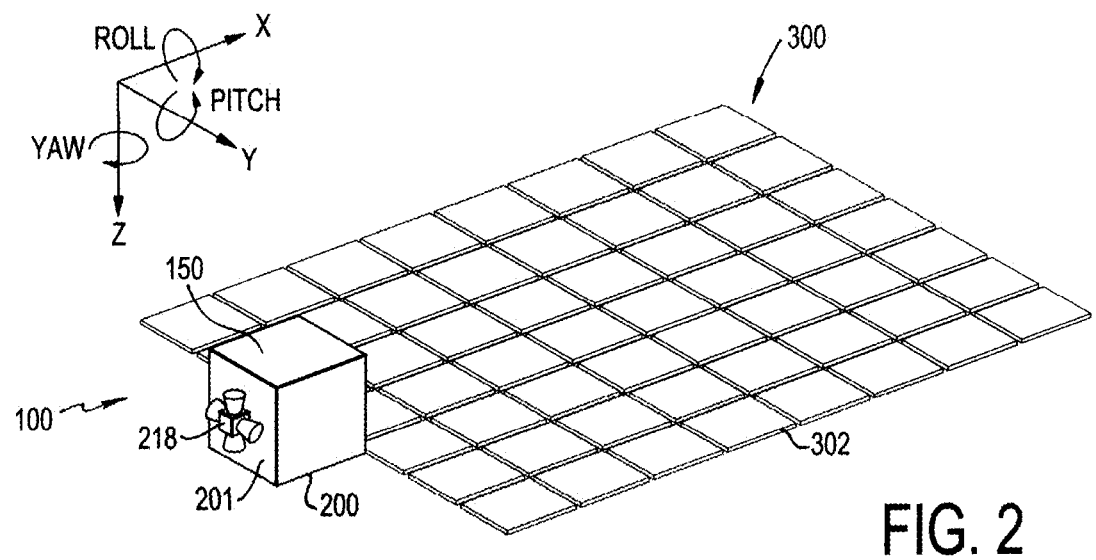
FIG. 2 is a perspective of a control satellite and a large array of common satellites.
Figure 5:
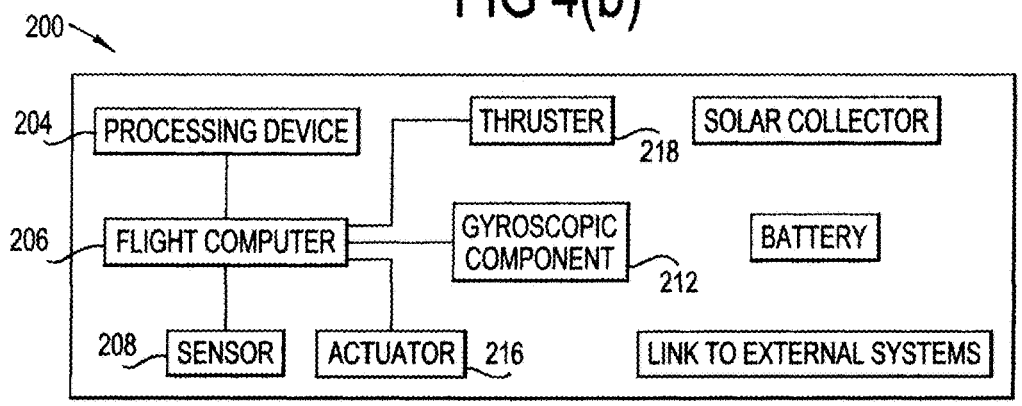

Turning to the drawings, FIG. 2 shows a satellite communication system 100 that controls large, flat plate-like objects in space. The system 100 includes a large phase array 300 and a control satellite 200 (FIG. 5). As illustrated in FIG. 2, the control satellite 200 can be coupled to an edge at one side of the phase array 300, and centered along the side. In other embodiments of the disclosure, the control satellite 200 can be coupled at an interior portion of the phase array 300, such as for example at the center of the phase array 300.

Figure 4A:
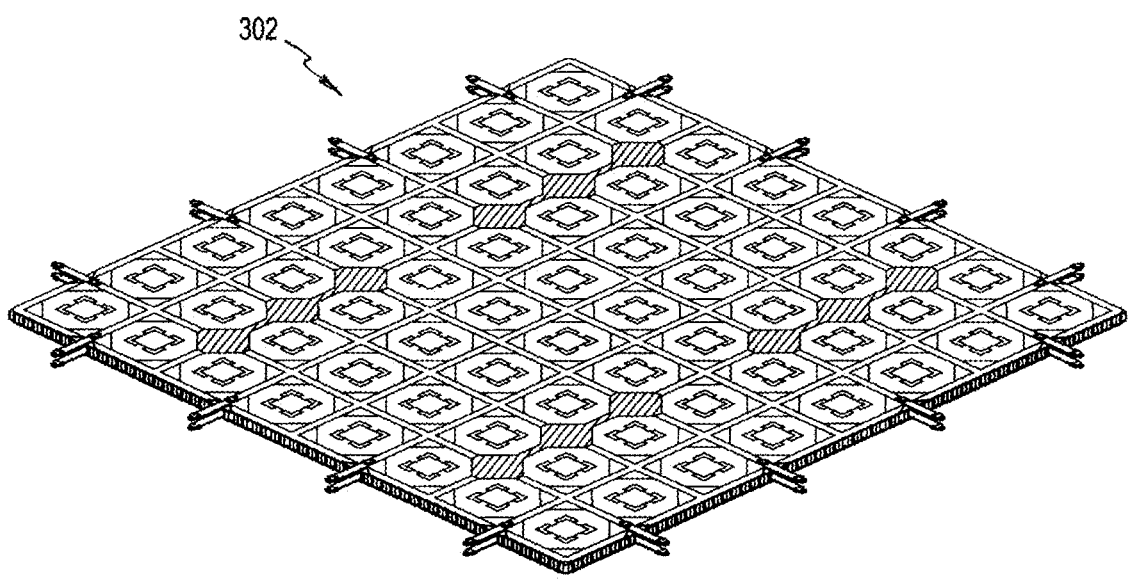
FIGS. 4(a), (b) and FIG. 5 illustrate satellite constituent components.
Figure 1B:
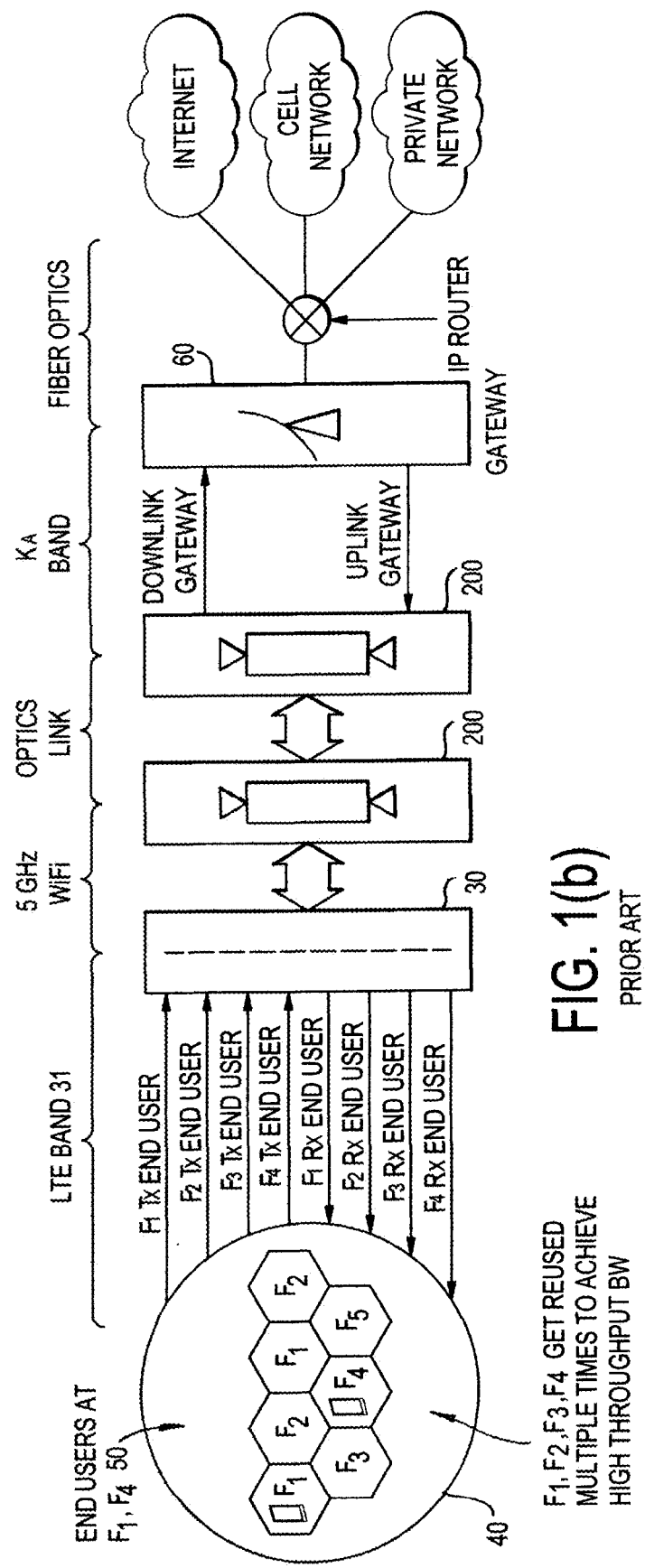
Figure 4B:
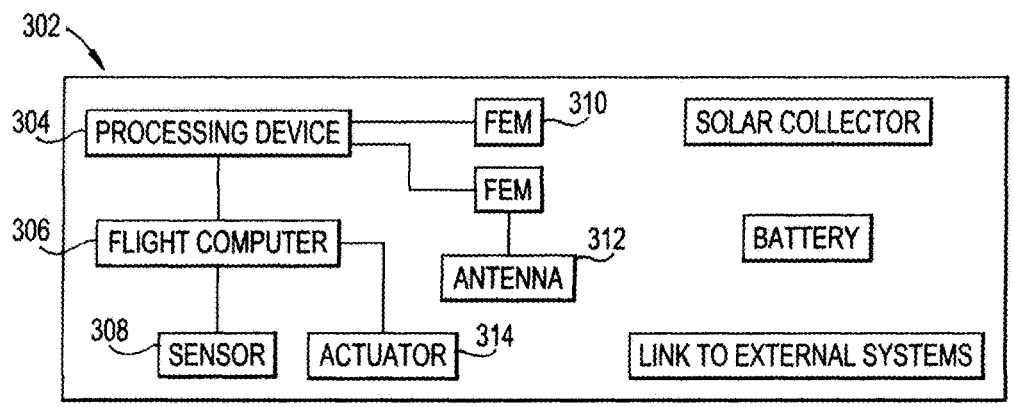

Referring to FIGS. 2, 4(a), 4(b), the array 300 includes a plurality (hundreds and possibly thousands) of discrete common satellites 302 that are coupled together such as by one or more connectors or coupling devices. The common satellites 302 are flat, i.e., the X and Y dimensions of the array 300 are significantly larger than the Z dimension, creating large moments of inertia. In one embodiment, the common satellites 302 are antenna elements, and the array 300 is a phased antenna array.

Each common satellite 302 comprises an antenna structure. In the example embodiment shown in FIG. 4(b), the common satellite 302 can include a number of electronic components including a common satellite processing device 304, front end modules (FEM) 310, flight computer 306, one or more common satellite sensors 308, one or more common satellite flight actuators 314, solar collector, and link to external systems. The solar collectors/cells generate energy from the sun. Excess power from the solar cells can charge a battery, and/or the battery can provide power to the electronic components. Each FEM 310 is associated with a respective antenna 312 to transmit/receive signals. A thruster can optionally also be provided at the common satellite 302.

The processing device 304 controls overall operation of the electronic components, including receiving/transmitting signals via the FEM 310. The flight computer 306 receives signals from the sensors 308 as to the orientation and location of the antenna structure 302. In response to the received sensor signals, the flight computer 306 determines current orientation and location and sends a control signal to the actuators 314 to properly position the antenna structure 302. When the common satellites 302 are coupled together, they form a large array 300 in space.

As shown in FIG. 5, the control satellite 200 includes a processing device 204, flight computer 206, one or more control satellite sensors 208, one or more control satellite actuators 216, and one or more control satellite thrusters 218. The control processor 204 can control operation of the control satellite 200, including the control satellite sensors 208, control satellite actuators 216, and a gyroscopic component 212. The control satellite sensors 208 can include, for example, star trackers, sun sensors, inertial measurement units and global position system units.

The control satellite 200 flight computer 206 controls the position and orientation of the control satellite 200 and the phase array 300. The flight computer 206 accepts sensor data from its own suite of control satellite sensor(s) 208 and any other sensor, such as the common satellite sensor(s) 308, to determine the orientation of the phase array 300. Based on the determined and desired orientation of the phase array 300, the flight computer 206 commands the control satellite actuators 216 and the common satellite actuators 314 of the common satellite 302, as necessary to ensure proper orientation of the phase array 300. In one embodiment, the control satellite sensor 208 can be a GPS sensor that provides position data. In another embodiment, the control satellite sensor 208 can be an IMU such as an accelerometer, which provides acceleration data from which position data can be determined.

Figure 3:
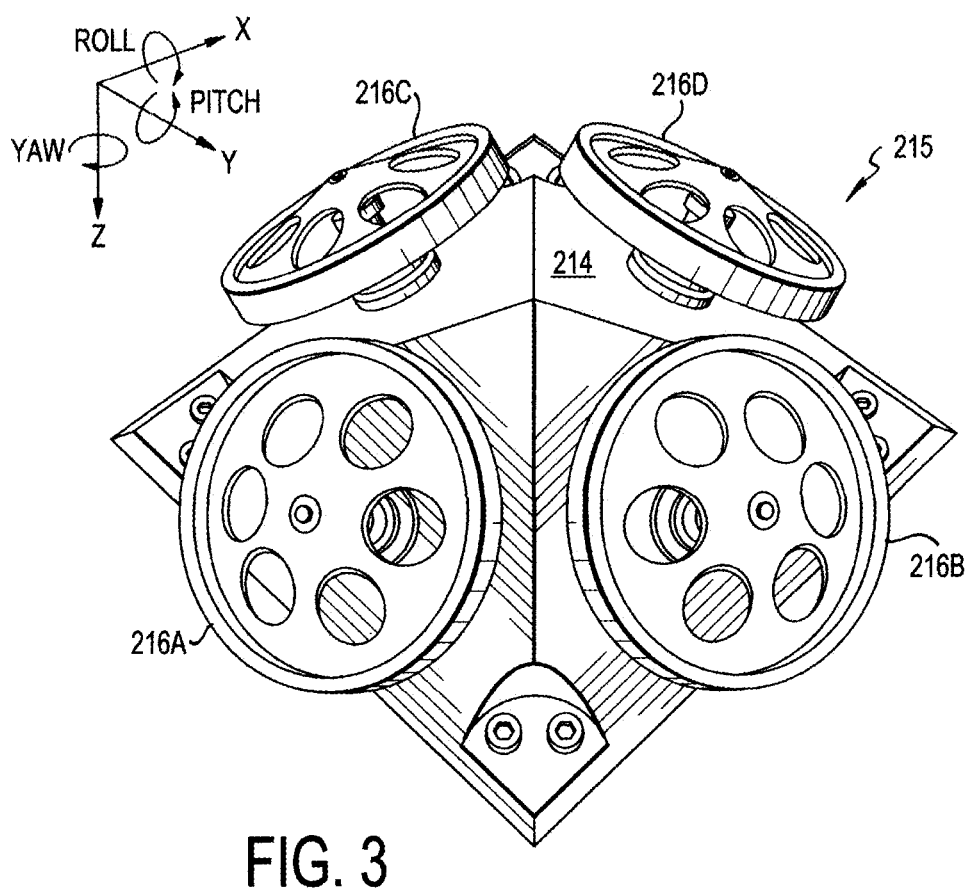
FIG. 3 illustrates the reconfigurable wheel having a momentum mode and a reaction mode.

As shown in FIG. 3, the control actuator 216 can comprise a control actuator assembly 215. The actuator assembly 215 includes, for example, a support member 214 and one or more reconfigurable reaction-momentum wheels 216a, 216b, 216c, 216d, and/or optional electromagnetic torque rods, which desaturate the wheels in low earth orbit. In any orbit, disturbances ultimately impart a torque on the spacecraft. For example, a gravity gradient might create a pitch down that a reaction wheel would negate by counter spinning. The gravity gradient will exert a continuous torque and so the wheel will keep spinning faster and faster until it reaches its maximum speed, saturating in other words. The torque rods remove the momentum, and therefore speed from the wheels by themselves producing a force/torque. The torque rods are typically aligned to the X-, Y-, and Z-coordinates, and in one embodiment can be connected (directly or indirectly) to the wheels.

The wheels 216 can be any suitable wheels that can control position and/or orientation of the control satellite 200 such as, for example, in accordance with U.S. Patent Publ. No. 2008/0099626. The gyroscopic component 212 can be, for example, an inertial measurement unit (IMU).

In one embodiment, the control satellite 200 has access to and authority over all sensor data from the control satellite sensors 208 and/or the common satellite sensors 308, as well as the control satellite actuators 216 and/or the common satellite actuators 314, to control the overall phase array 300 and system 100 orientation. The control satellite flight computer 206 reads in all sensor data from the sensors 208, 308 and commands all actuators 216, 314. The common satellite flight computer 206 for each small structure common satellite 302, only reads in its own sensor data from its common satellite sensor 308 to control its common satellite actuator 314, to correct its own orientation within the phase array 300.

Returning to FIG. 2, the control satellite 200 body housing 201 is fixedly attached to the large phase array 300. The control satellite 200 can have a control satellite body 201 with a cuboid shape. The control satellite body 201 houses the control satellite components shown in FIG. 5, including the actuator assembly 215 (FIG. 3).

The common satellites 302 are connected together to form a phase array 300 having a desired shape, here shown as a flat rectangle or square, though other suitable shapes can be utilized such as circular. The common satellites 302 have a body that is flat and thin, whereby the structure of the array 300 is flat and this, and can be extremely large, heavy and rigid or semi-rigid. While typical satellites have a rectangular cuboid (three-dimensional rectangle) shape, the phase array 300 is a rectangular plate (cuboid with near zero height), which spreads the mass out further from the control point, spacecraft 200, increasing the moments of inertia by a factor of two to three. Those inertias are acted upon by the gravity gradient of the planetary body being orbited, such as Earth, creating a set of problems: A) actuators are needed to provide larger than normal torques for precision attitude control of the system 100, B) actuators are needed to store larger than normal momentum of the system 100, and C) actuators are needed to recover large deviations from nominal attitudes of system 100.

The array 300 can have one or more edges formed by peripheral ones of the common satellite 302. The control satellite 200 can be connected at one of the common satellites 302 at an edge of the array 300. At the edge, the thrusters 218 of the control satellite 200 have a greater angular torque and can more readily control the pitching and yaw of the array structure 300. In other embodiments, the control satellite 200 can be connected at the center or mid-portion of the array 300. At the edge, the moments of inertia are higher than in a center mounted configuration, exacerbating the problem.

In one example embodiment of the disclosure, the control satellite body 201 provides a housing that houses four chemical thrusters 218 (FIG. 2). In one example embodiment, the housing 201 fully encloses the thrusters 218 as well as other components including those shown in FIG. 5. The thrusters 208 provide attitude control, including yaw (Z-axis), pitch (Y-axis) and roll (X-axis). The four chemical thrusters 218 are arranged in a plus or cross pattern, with a thruster 218 at the top, bottom, left and right sides (aligned with +/−Z and +/−Y axes). The top and bottom chemical thrusters 218 create a thrust that projects upward and downward with respect to the control satellite 200 housing, which forces that edge of the phase array 300 downward and upward, respectively. Thus, the top and bottom thrusters 218 control the pitch of the phase array structure 300. The left and right chemical thrusters 218 create a thrust that projects to the left and right with respect to the control satellite housing, which in turn forces the phase array structure 300 to rotate right and left, respectively. Thus, the left and right thrusters 218 control the yaw of the phase array structure 300 to rotate the phase array structure 300 in its plane. Roll is controlled by yawing first with the "left and right" thrusters then using the "up and down" thrusters.

Referring to FIGS. 2, 3, the control satellite body 201 houses one or more actuator assemblies 215, including one or more reconfigurable reaction-momentum wheels 216. In the example embodiment shown, the body 201 fully encloses (or at least partially encloses) the reconfigurable reaction-momentum wheels 216. As shown, the wheels are flat and round, and extend in a respective plane. As used herein, the reaction-momentum wheels 216 in momentum mode rotate at higher speeds and are capable of storing momentum; whereas the reaction-momentum wheels 216 in reaction mode rotate at lower speeds and provide greater torque. Thus, the reaction mode allows for finer control, and can be used for example to provide precision pointing and tilting of the array 300, and the momentum mode can be used for example to provide coarse control for coarse pointing and tilting or tilt recovery of the array 300.

For a large, flat, thin array 300 it is desired to produce the gyroscopic torque to counteract the satellite's gyroscopic torque and the gravity gradient. In a classic satellite, that has smaller deployed structures and lower momentum of inertia, the momentum storage function is taken up by wheels that align with the principal rotation axes, yaw, pitch and/or roll, depending on which axes is most effected by the disturbance torque. If this principal is extended to system 100, then the gravity gradient acts most on the X and Y axes and so the wheels would need to align with the roll and pitch axes for momentum management. Such a configuration requires multiple wheels to achieve the needed momentum storage capability. If the wheels are instead placed in the yaw axis to store momentum by generating gyroscopic torque, then the satellite can employ the pyramid wheel arrangement to achieve the desired effect with fewer wheels. To produce a gyroscopic torque about the roll axis and using the satellite's natural pitch axis rotation rate, the satellite holds momentum about the zenith vector (Z). If the satellite points its momentum wheel zenith, the satellite is tipping from side to side. Given that sometimes the satellite tips left and sometimes it tips right, pointing the momentum vector normal to the array provides the best option to get the satellite momentum pointed zenith.

The wheels 216 are mounted to a support member 214, which in turn is coupled to the control satellite housing 201. In the example embodiment shown, the support member 214 can have a pyramid shape with triangular side surfaces and a square base shape. The side surfaces are orthogonal to one another. A wheel 216 is located at each of four triangular flat side surfaces. For example, the base of the support member 214 can be mounted to the bottom of the housing 201, such as for example by fastening members (e.g., bolts) that extend through openings in the base of the support member 214. The wheels 216 can be exposed, as shown, or contained inside respective housings (not shown) that partially or fully enclose the wheels 216. The wheels 216 can be independently or simultaneously controlled to operating in a reaction operating mode or a momentum operating mode. Though all of the wheels 216 are shown mounted to a single unitary support member 214, other embodiments can include a separate support member 214 for a single wheel 216, or multiple wheels 216 mounted to each of separate support members 214 and mounted at different positions within the control housing 201.

Thus, in the example embodiment shown, four reconfigurable reaction-momentum wheels 216 are provided. They are arranged in a four-wheel pyramid configuration. With a pyramid configuration the wheels 216 can be tilted towards the X-Y plane to provide increased reaction torque or momentum storage capability in the X-Y plane while still maintaining three axis control over the entire satellite 100 with one fault tolerant redundancy; tilting away provides the inverse effect. In an example embodiment, the tilt can be 30-70 degrees based on the flight moments of inertia. The control of satellite's gyroscopic torque and the gravity gradient torques with momentum stored about the Z axis (generating its own torque), using reconfigurable reaction-momentum wheels arrangement in a pyramid configuration is the crucial aspect of the invention. Of course, fewer or more wheels 216 can be provided. The support 214 is mounted, for example, to the bottom of control satellite housing 201 so that the coordinate systems align. It also contains the control electronics for the reaction-momentum wheels.

Accordingly, the system 100 has dual purpose wheels 216 in combination with chemical thrusters 218, and in particular the system 100 comprises a satellite system. The system is oriented such that the +X direction is in the velocity vector. As shown, in certain embodiments the array 300 can be planar and relatively flat, large, thin, and heavy. The whole space system has a large mass and moments of inertia, making the satellite array 300 difficult to control.

Figure 6:
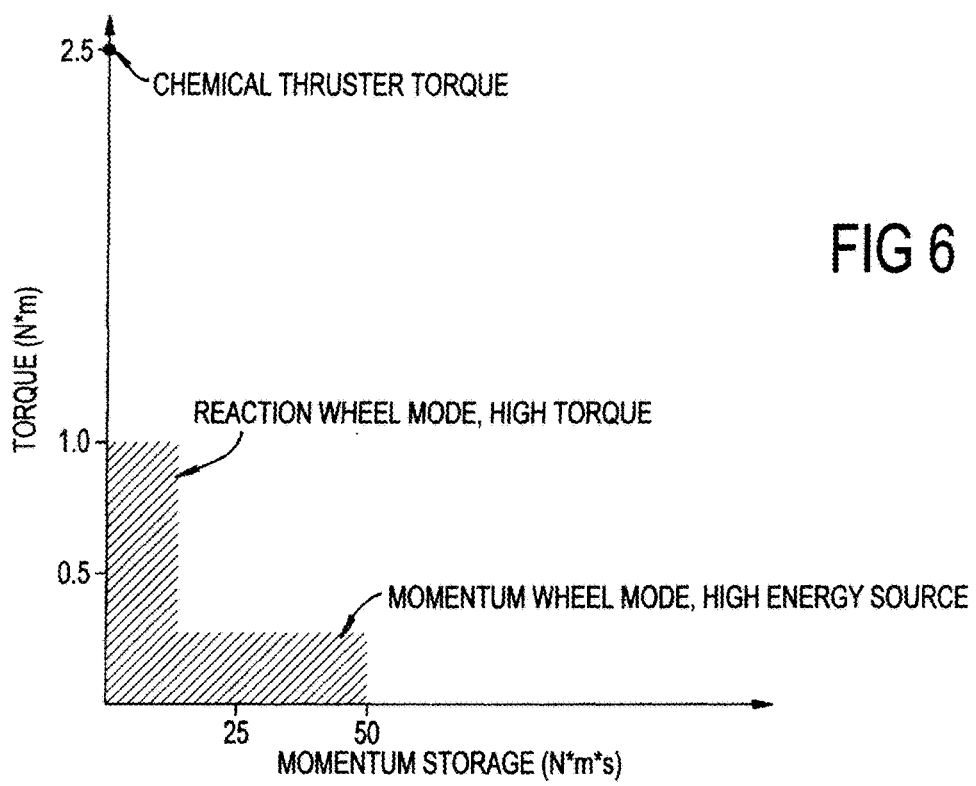
FIG. 6 plots the torque and momentum storage for the chemical thrusters, reaction wheel mode and the momentum wheel mode.

For attitude maneuvers, reconfigurable reaction-momentum wheels 216 (FIG. 3), and chemical thrusters 218 (FIG. 2) are utilized. The wheels are in a specific orientation, linked through the X-Y-Z coordinate system. The positional placement within the satellite does not matter and any suitable position can be utilized, and the wheels need not be in the X-Y-Z planes. As illustrated in FIG. 6, the reaction wheel mode provides the function of higher torque capability for precise maneuvering capability. The momentum wheel mode provides the function to store higher momentum, enabling the spacecraft to cancel out the momentum induced by the attitude rates needed to enable the spacecraft to track the Earth. The wheel in momentum operating mode stores more momentum at the cost of torque while wheels in reaction mode can produce more torque compared to momentum wheels.

In one embodiment, the system 100 combines a reaction operating mode with a momentum operating mode to enable the wheels 216 to switch from high torque capability to high momentum storage capability by dynamically changing the windings from operating in parallel to in series. This can be controlled by the control processor 204 and/or the common processor 304.

The four chemical propulsion thrusters (FIG. 2), aligned with the Y and Z axes, enable high torque control of the pitch and yaw axes to enable recovery during anomalous events or to perform high-rate maneuvers that would not be possible with the torque induced by reaction wheels. When the thrusters aligned with the Y axis produce thrust, they effect yaw control. When the thrusters aligned with the Z axis produce thrust, the effect pitch control. Given the large moment arm (distance from center of gravity), the effectiveness of the thrusters is greatly enhanced. While reaction wheels are used to control yaw, pitch and roll, their torque is a fraction of the imparted torque by the reaction wheels. Furthermore, reaction wheels can saturate during high torque, short duration maneuvers. The reaction wheels provide three axis control during nominal operations while the thrusters provide high torque, high-rate control or maneuvers.

The embodiment controls a large, deployed structure in space, provides recovery during large attitude disturbances or anomalous events, optimization avoiding the need for overly large reaction wheels, and combines reaction wheels with momentum wheels to enable momentum cancellation with high torque, based on mission phase need. Using chemical thrusters only is prohibitive due to the large amount of propellant needed to be stored in pressurized tanks, a problem exacerbated by multi-year missions. Using reaction wheels only would mean overly sized wheels to provide the needed momentum storage. Using momentum wheels only would mean using overly sized wheels to provide the needed torque. Using a combination of separate reaction and separate momentum wheels doubles up the mass and volume, creating prohibitive packaging problems given the need for already substantial reaction-momentum wheels. In the example embodiment of utilizing wheels that are reconfigurable to provide both a reaction wheel mode and a momentum wheel mode, reduces the space requirement.

It is noted that more than one control satellite 200 can be provided. And, the control satellite(s) 200 need not have a processing device 204, flight computer 206, sensor 208, gyroscopic component 212, solar collector, battery or link. Rather, the wheels 216 can be provided in a housing that is coupled to a structure or other object in space to control the orientation of the object.

In the embodiments shown, the small satellites 302 and/or the central satellite 200 can include a processing device to perform various functions and operations in accordance with the disclosure. The processing device can be, for instance, a computing device, processor, application specific integrated circuits (ASIC), or controller. The processing device can be provided with one or more of a wide variety of components or subsystems including, for example, wired or wireless communication links, and/or storage device(s) such as analog or digital memory or a database. All or parts of the system, processes, and/or data utilized in the invention can be stored on or read from the storage device. The processing device can execute software that can be stored on the storage device. Unless indicated otherwise, the process is preferably implemented in automatically by the processor substantially in real time without delay.

In yet another embodiment of the present disclosure, data (such as position and attitude) can be transmitted from the satellites 200 (e.g., by processing devices 204) to a ground station. The ground station processing device can then determine the necessary adjustments and/or other flight information and transmit a control signal to the satellites 200 (e.g., processing devices 204) to control the flight pattern (e.g., by use of the actuators, 216, 218, 212).

When the structure 100 is configured as an antenna array, it (e.g., antenna 312 or antenna elements) communicates with processing devices on Earth, such as for example a user device (e.g., user equipment such as a cell phone, tablet, computer) and/or a ground station. The present disclosure also includes the method of utilizing the structure 100 to communicate with processing devices on Earth (i.e., transmit and/or receive signals to and/or from). The present disclosure also includes the method of processing devices on Earth communicating with the structure 100 (i.e., transmit and/or receive signals to and/or from). In addition, while the structure 100 is used in Low Earth Orbit (LEO) in the examples disclosed, it can be utilized in other orbits or for other applications. Still further, while the system has been described as for an array of antenna assemblies, the system can be utilized for other applications, such as for example data centers, telescopes, reflectors, and other structures, both implemented in space or terrestrially.

Still further, while the wheels 216 and thrusters 218 are shown as part of the control satellite 200 having a processor 200, the wheels 216 and/or thrusters 218 can be separate devices. For instance, the control satellite 200 can have its own housing and the wheels and/or thrusters can have its own housing that is separate from the control satellite housing. In addition, the wheels and thrusters can be provided internal to the housing, and/or can be at the outside of the housing.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the drawings may illustrate, and the description and claims may use geometric or relational terms, such as planar, wheel, thin, top, bottom, right, left, side, rectangle, square. These terms are not intended to limit the disclosure and, in general, are used for convenience to facilitate the description based on the examples shown in the figures. In addition, the geometric or relational terms may not be exact.

What is claimed is:

1. A spacecraft comprising:
   an antenna element;
   one or more reconfigurable reaction-momentum wheels coupled to the antenna element and operable to roll or pitch the antenna element, wherein each reconfigurable reaction-momentum wheel of the one or more reconfigurable reaction-momentum wheels is tilted towards at least two planes of a three-dimensional plane; and
   a thruster coupled to the antenna element and operable to move the antenna element.

2. The spacecraft of claim 1, the flat antenna element having an edge, and the spacecraft further comprising a housing coupled to the edge of the antenna element, the housing enclosing the one or more reconfigurable reaction-momentum wheels.

3. The spacecraft of claim 2, the thruster coupled to said housing.

4. The spacecraft of claim 1, wherein the thruster is operable to provide a first magnitude thrust and wherein each reconfigurable reaction-momentum wheel of the one or more reconfigurable reaction-momentum wheels is operable to provide a second magnitude thrust that is smaller than the first magnitude thrust.

5. The spacecraft of claim 1, wherein the antenna element comprises a flat antenna element included in an antenna assembly having a plurality of flat antenna elements.

6. The spacecraft of claim 1, further comprising a plurality of flat antenna elements forming an antenna array having a middle portion, and a housing coupled at the middle portion of the antenna array and enclosing the one or more reconfigurable reaction-momentum wheels.

7. A communication system comprising:
   a phase array having a plurality of common antenna elements coupled together having a thin planar structure, the phase array having an outer portion;
   a control device having a housing coupled to the outer portion of the phase array;
   one or more reconfigurable reaction-momentum wheels contained in the housing and operable to rotate or pitch the phase array structure, wherein each reconfigurable reaction-momentum wheel of the one or more reconfigurable reaction-momentum wheels is tilted towards at least two planes of a three-dimensional plane; and one or more thrusters coupled to the housing and operable to move the phase array structure in a plurality of directions.

8. The system of claim 7, wherein the control device comprises a satellite.

9. The system of claim 7, further comprising a control processor in the housing, the control processor operating the one or more reconfigurable reaction-momentum wheels and the one or more thrusters.

10. The system of claim 7, further comprising one or more sensors operable to detect a position or orientation of the phase array structure.

11. The system of claim 10, wherein the control processor operates the one or more reconfigurable reaction-momentum wheels and the one or more thrusters based on the detected position or orientation of the phase array structure.

12. The system of claim 7, the control device is operable to control a deployed structure in space for attitude changes and precision attitude control.

13. The system of claim 7, the one or more reconfigurable reaction-momentum wheels having a first mode that provides attitude control.

14. The system of claim 13, the one or more reconfigurable reaction-momentum wheels having a second mode that provides attitude changes greater than the first mode.

15. The system of claim 7, system having attitude offset recoveries using four chemical thrusters.

16. The system of claim 7, one or more reconfigurable reaction-momentum wheels operable to provide momentum cancellation with torque, based on mission phase need.

17. The spacecraft of claim 1, wherein each reconfigurable reaction-momentum wheel of the one or more reconfigurable reaction-momentum wheels is tilted at an angle based on moments of inertia of a flight path of the spacecraft.

18. The spacecraft of claim 1, wherein each reconfigurable reaction-momentum wheel of the one or more reconfigurable reaction-momentum wheels is tilted at an angle from 30 degrees to 70 degrees.

19. The spacecraft of claim 1, wherein the one or more reconfigurable reaction-momentum wheels are arranged in a pyramid configuration.

20. The spacecraft of claim 1, wherein the one or more reconfigurable reaction-momentum wheels comprise at least four reconfigurable reaction-momentum wheels arranged in a pyramid configuration.

21. The spacecraft of claim 1,
wherein the three-dimensional plane comprises an X-plane representing a roll axis, a Y-plane representing a pitch axis, and a Z-plane representing a yaw axis, and
wherein each reconfigurable reaction-momentum wheel of the one or more reconfigurable reaction-momentum wheels is tilted towards the X-plane and the Y-plane.

* * * * *